(12) United States Patent
Sheng et al.

(10) Patent No.: US 10,679,225 B2
(45) Date of Patent: Jun. 9, 2020

(54) SYSTEM FOR EXAMINING SERVICE CERTIFICATIONS WITH MULTI-SIDES BASED ON CUSTOMER EXPERIENCES

(71) Applicant: CHINA CERTIFICATION & ACCREDITATION ASSOCIATION, Beijing (CN)

(72) Inventors: Fei Sheng, Beijing (CN); Binyou Fu, Beijing (CN); Xijun Li, Beijing (CN)

(73) Assignee: CHINA CERTIFICATION & ACCREDITATION ASSOCIATION, Beijing (CN)

( * ) Notice: Subject to any disclaimer, the term of this patent is extended or adjusted under 35 U.S.C. 154(b) by 181 days.

(21) Appl. No.: 15/928,981

(22) Filed: Mar. 22, 2018

(65) Prior Publication Data

US 2018/0285898 A1 Oct. 4, 2018

(30) Foreign Application Priority Data

Mar. 31, 2017 (CN) .......................... 2017 1 0206771

(51) Int. Cl.
*G06Q 10/00* (2012.01)
*G06Q 30/02* (2012.01)
(Continued)

(52) U.S. Cl.
CPC ..... *G06Q 30/0201* (2013.01); *G06F 21/6245* (2013.01); *G06K 7/10722* (2013.01);
(Continued)

(58) Field of Classification Search
None
See application file for complete search history.

(56) References Cited

U.S. PATENT DOCUMENTS 9,912,781 B2 * 3/2018 Brech .................. G06F 8/65
9,996,840 B2 * 6/2018 Wood ............. G06Q 30/0185
(Continued)

FOREIGN PATENT DOCUMENTS

CN 101075316 11/2007
CN 105117427 12/2015

OTHER PUBLICATIONS

Datta, Khyati, A SERVQUAL-Based Framework for Assessing Quality of International Branch Campuses in UAE: A Management Student's Perspective, Feb. 1, 2017, Sage Journals, https://journals.sagepub.com/doi/full/10.1177/2158244016676294, p. 1-18.*
(Continued)

*Primary Examiner* — Joseph M Waesco
(74) *Attorney, Agent, or Firm* — Hodgson Russ LLP

(57) ABSTRACT

A system for examining service certifications with multi-sides based on customer experiences is provided, including: a database, an analysis processor, a certification system, an accreditation system, a registration system for a certification officer to register, an internal system of a service firm and a mobile terminal. A first time certification is performed on services from the service firm by the certification system to obtain a service certification credential. A first QR code is identified to obtain an organization name of the certification organization, basic information of the service certification credential, accreditation information of the accreditation system, registration information of the certification officer registered in the registration system and authorization information, authorized by the Certification and Accreditation Administration, for carrying out service certification businesses of the certification organization. After a second QR code is identified, the mobile terminal is linked to a customer experience collecting interface via the database.

13 Claims, 2 Drawing Sheets

(51) Int. Cl.
*G06F 21/62* (2013.01)
*G06K 7/14* (2006.01)
*G06K 7/10* (2006.01)

(52) U.S. Cl.
CPC ....... *G06K 7/10881* (2013.01); *G06K 7/1417* (2013.01); *G06Q 30/0207* (2013.01); *G06K 2007/10524* (2013.01)

(56) References Cited

U.S. PATENT DOCUMENTS

| | | | | |
|---|---|---|---|---|
| 10,186,128 B2 * | 1/2019 | Gao | ...................... | G07G 1/0081 |
| 10,559,383 B2 * | 2/2020 | Stewart | ................. | H04W 4/021 |
| 2007/0180490 A1 * | 8/2007 | Renzi | ................... | H04L 63/145 |
| | | | | 726/1 |
| 2013/0013499 A1 * | 1/2013 | Kalgi | ................... | G06Q 20/34 |
| | | | | 705/41 |
| 2013/0246342 A1 * | 9/2013 | Faith | ...................... | G06Q 30/06 |
| | | | | 707/607 |
| 2014/0304183 A1 * | 10/2014 | Zabar | ................ | G06Q 10/1053 |
| | | | | 705/321 |
| 2014/0337175 A1 * | 11/2014 | Katzin | ................... | G06Q 30/00 |
| | | | | 705/26.62 |
| 2015/0039462 A1 * | 2/2015 | Shastry | .............. | G06Q 30/0631 |
| | | | | 705/26.7 |
| 2015/0058162 A1 * | 2/2015 | Purves | ................... | H04L 67/22 |
| | | | | 705/26.8 |
| 2015/0058931 A1 * | 2/2015 | Miu | .................. | G06Q 20/4016 |
| | | | | 726/3 |
| 2015/0058950 A1 * | 2/2015 | Miu | .................. | G06Q 20/4016 |
| | | | | 726/7 |
| 2015/0059003 A1 * | 2/2015 | Bouse | .................. | H04L 63/102 |
| | | | | 726/28 |
| 2015/0278824 A1 * | 10/2015 | Zabar | ................ | G06Q 10/1053 |
| | | | | 705/317 |
| 2016/0379192 A1 * | 12/2016 | Purves | ................ | G06Q 20/105 |
| | | | | 705/41 |
| 2017/0006010 A1 * | 1/2017 | Miu | .................. | G06Q 20/4016 |
| 2017/0116403 A1 * | 4/2017 | Bouse | .................... | G06F 21/31 |
| 2017/0134479 A1 * | 5/2017 | Kalgi | ..................... | H04L 67/20 |
| 2017/0235786 A9 * | 8/2017 | Faith | .................. | G06F 16/9024 |
| | | | | 707/607 |
| 2018/0046623 A1 * | 2/2018 | Faith | ...................... | G06Q 30/06 |
| 2018/0096175 A1 * | 4/2018 | Schmeling | ............. | B29C 64/10 |
| 2018/0189756 A1 * | 7/2018 | Purves | .................. | G06Q 20/28 |
| 2018/0285898 A1 * | 10/2018 | Sheng | ................ | G06K 7/10881 |
| 2019/0075156 A1 * | 3/2019 | Kalgi | ..................... | G06Q 20/20 |
| 2019/0163889 A1 * | 5/2019 | Bouse | .................... | G06F 21/32 |

OTHER PUBLICATIONS

SIPO, First Office Action for CN Application No. 201710206771, dated Mar. 26, 2019.

* cited by examiner

SYSTEM FOR EXAMINING SERVICE CERTIFICATIONS WITH MULTI-SIDES BASED ON CUSTOMER EXPERIENCES

CROSS-REFERENCE TO RELATED APPLICATIONS

This application is based on and claims priority to Chinese Patent Application No. 201710206771.X, filed on Mar. 31, 2017, the entire contents of which are incorporated herein by reference.

TECHNICAL FIELD

The present disclosure relates to the field of certification and accreditation, and more particularly, to a system for examining service certifications with multi-sides based on customer experiences.

BACKGROUND

With the rapid rise and development of service industries, a service certification system based on a quality management system (ISO 9001) that has been proved successful in manufacturing industries, is introduced to the service industries in order to establish good reputations and improve customer satisfaction. The service certification system has been primarily proposed and studied in Europe. The service certification system generally relates to service businesses. However, the service certification system is studied based on service products, and it is an exploration and a practice of the service certification, not forming a technical system and a technical method of service certification.

SUMMARY

Embodiments of the present disclosure provide a system for examining service certifications with multi-sides based on customer experiences. The system includes: a database at a side of Certification and Accreditation Administration; an analysis processor at the side of the Certification and Accreditation Administration; a certification system at a side of a certification organization; an accreditation system at a side of Accreditation Service for Conformity Assessment, configured to accredit the certification organization; a registration system at a side of Certification and Accreditation Association for a certification officer to register; an internal system at a side of a service firm; and a mobile terminal at a side of a consumer, in which a first time certification is performed on services from the service firm by the certification system to obtain a service certification credential of the service firm, the service certification credential includes basic information of the service certification credential, a first QR (Quick Response) code configured to inquire a validity of the service certification credential and a second QR code configured to collect customer experiences; the mobile terminal is configured to identify the first QR code, and to receive, sent by the certification system, an organization name of the certification organization, the basic information of the service certification credential, accreditation information indicating that the certification organization is accredited by the accreditation system, registration information of a certification officer registered in the registration system, and authorization information, authorized by the Certification and Accreditation Administration, for carrying out service certification businesses of the certification organization; after the second QR code is identified by the mobile terminal, the mobile terminal is linked to a customer experience collecting interface at the side of the Certification and Accreditation Administration via the database, wherein the customer experience collecting interface includes: basic information of the service firm and a customer experience collecting module, wherein the basic information of the service firm includes, provided by the internal system, facilities supported by the service firm, management regulations of the service firm and a service blueprint of the service firm, and the costumer experience collecting module includes a costumer identity verification module, a scale module set according to an indicator system based on SERVOUAL (Service Qualit), an inputting module configured to input customer comments, and a rewarding module configured to reward the customers.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above or additional aspects and advantages of embodiments of the present disclosure will become apparent and more readily appreciated from the following descriptions made with reference to the drawings, in which.

DETAILED DESCRIPTION

Figure 1:
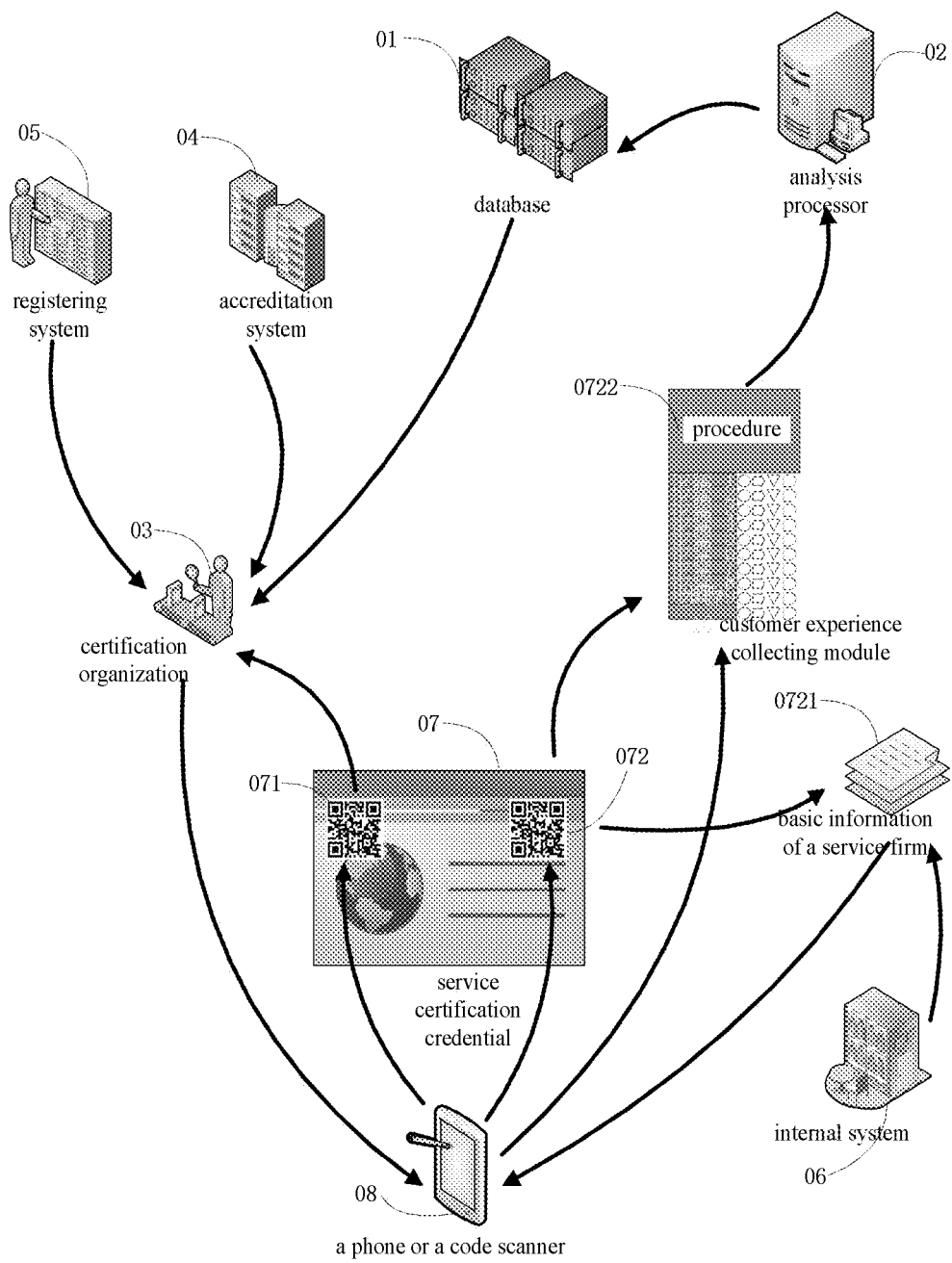
FIG. 1 is a schematic diagram illustrating a system for examining service certifications with multi-sides based on customer experiences according to embodiments of the present disclosure.

Embodiments of the present disclosure will be described below, in which examples of the embodiments are illustrated in the drawings. The same or similar elements and the elements having same or similar functions are denoted by like reference numerals throughout the descriptions. The embodiments described herein with reference to drawings are explanatory, used to understand the present disclosure, and not construed to limit the present disclosure.

As the quality management system is based on the manufacturing industries, effects of employing the certification system based on the quality management system in the service industries are not well.

The development of the service industries is unable to be separated from a service quality. The quality is representative of core competences of a firm and a level of civilization of a country. The quality is a strategic problem during a development of economic society and relates to a sustainable development of the society, vital interests of the people and a national image. It is required to participate with the service certification system to ensure an improvement of the quality. Therefore, to prefect the service certification system is a basis of the improvement of the service quality, which is conducive to the development of the service industries and is the only way to realize a Service-oriented economic society. Furthermore, as the development of the service certification in some countries is in initial stages, and regulations are not built, thus the service certification has a narrow coverage and a shallow expanding depth. In addition, a confidence of the service certification is not established among the market or customers. Therefore, there is not a unified regulation of the service certification until now.

Now the system for examining service certifications with multi-sides based on customer experiences according to embodiments of the present disclosure will be described with reference to the drawings.

FIG. 1 is a schematic diagram illustrating a system for examining service certifications with multi-sides based on customer experiences according to an embodiment of the present disclosure. As illustrated in FIG. 1, the system includes: a database 01 at a side of Certification and Accreditation Administration, an analysis processor 02 at the side of the Certification and Accreditation Administration, a certification system 03 at a side of a certification organization, an accreditation system 04 at a side of Accreditation Service for Conformity Assessment configured to accredit the certification organization, a registration system 05 at a side of Certification and Accreditation Association for a certification officer to register, an internal system 06 at a side of a service firm and a mobile terminal 08 at a side of a consumer. For example, the mobile terminal 08 may be, but not limited to, a smart phone or a handheld typed code scanner.

In detail, a first time certification is performed on services from the service firm by the certification system 03 to obtain a service certification credential 07 a first time certification is performed on the service firm. As shown in FIG. 1, the service certification credential 07 includes basic information of the service certification credential, a first QR (Quick Response) code 071 configured to inquire a validity of the service certification credential 07 and a second QR code 072 configured to collect customer experiences input by customers.

The mobile terminal 08 may be configured to identify the first QR code 071 and to receive, sent by the certification system 03, an organization name of the certification organization, the basic information of the service certification credential, accreditation information indicating that the certification organization is accredited by the accreditation system 04, registration information of a certification officer registered in the registration system 05, authorization information, authorized by the Certification and Accreditation Administration, for carrying out service certification businesses of the certification organization and the like. In other words, when the first QR code 071 of the service certification credential 07 is scanned via the mobile terminal 08 (e.g. a phone or a handheld typed code scanner) by the customer, the certification system 03 at the side of the certification organization may send the organization name of the certification organization, the basic information of the service certification credential, the accreditation information indicating that the certification organization is accredited by the accreditation system 04, the registration information of a certification officer registered in the registration system 05, the authorization information, authorized by the Certification and Accreditation Administration, for carrying out service certification businesses of the certification organization authorized and the like to the mobile terminal 08.

After the second QR code 072 is identified by the mobile terminal 08, the database 01 may link the mobile terminal 08 to a customer experience collecting interface at the side of the Certification and Accreditation Administration. The customer experience collecting interface includes basic information 0721 of the service firm and a customer experience collecting module 0722. The basic information 0721 of the service firm includes, provided by the internal system 06, facilities supported by the service firm, management regulations of the service firm, a service blueprint 063 of the service firm and the like. The customer experience collecting module 0722 includes a costumer identity verification module, a scale module set according to an indicator system based on SERVOUAL (Service Qualit), an inputting module configured to input customer comments, and a rewarding module configured to reward the customers. In other words, when the second QR code 072 of the service certification credential is scanned via the mobile terminal 08 (e.g. a phone or a handheld typed code scanner) by the customer, the database 01 may link the mobile terminal 08 to the customer experience collecting interface. The interface includes two parts. One of the two parts is the basic information of the service firm 0721, and the other one is the customer experience collecting module 0722. The basic information of the service firm 0721 includes, sent by the internal system 06, the facilities supported by the service firm, the management regulations of the service firm, and the service blueprint 063 of the service firm. The customer experience collecting module 0722 includes the costumer identity verification module, the scale module set according to the indicator system based on SERVOUAL, the inputting module configured to input the customer comments and the rewarding module configured to reward the customers.

Figure 2:
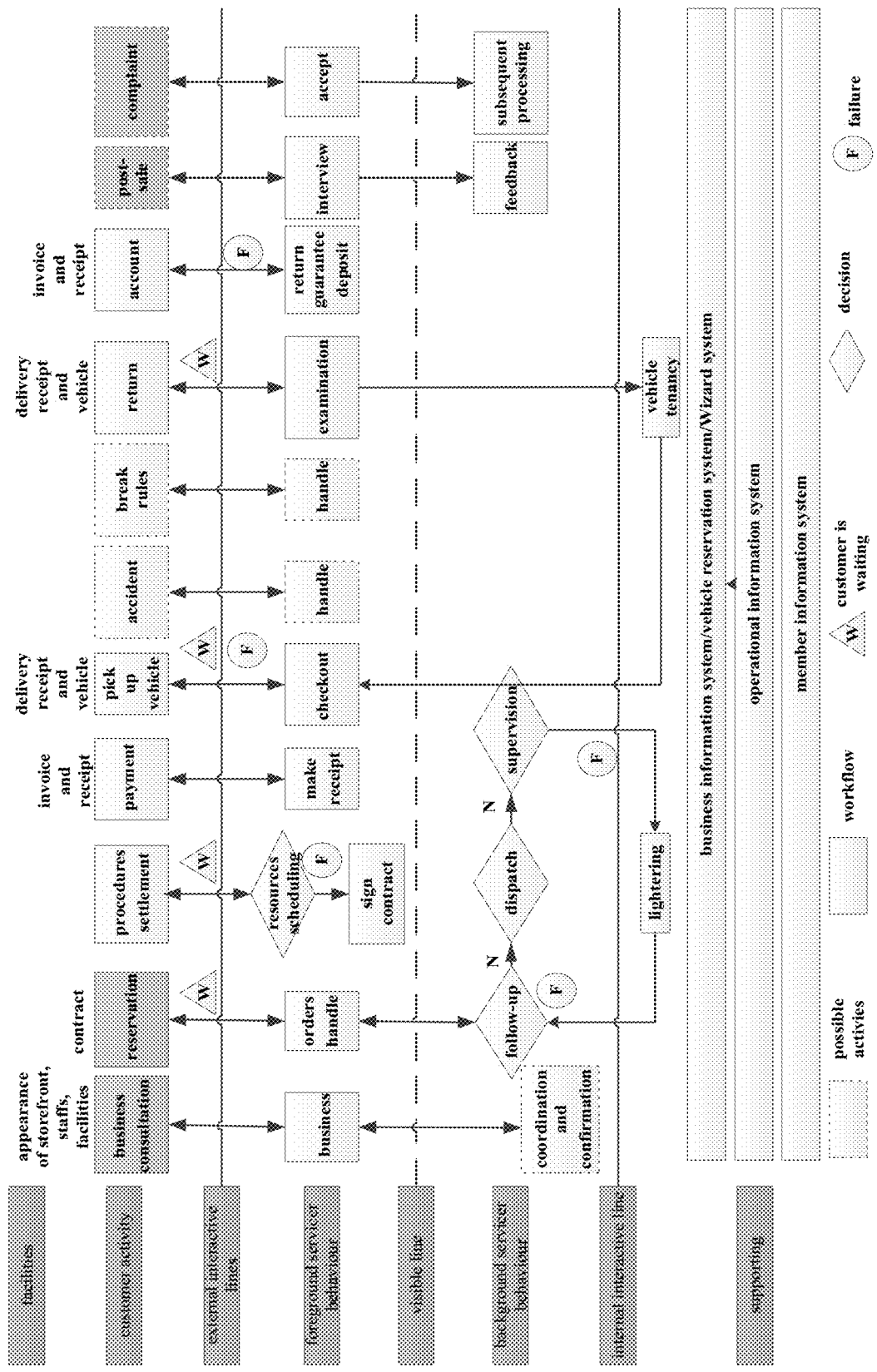
FIG. 2 is a service blueprint of a typical service firm according to a specific embodiment of the present disclosure.

In an embodiment of the present disclosure, in the service blueprint 063, nodes associated with the customers may be clickable for a customer to evaluate. For example, a service blueprint of a typical service firm is exemplarily shown in FIG. 2.

In an embodiment of the present disclosure, the identity verification module is configured to verify the customer by taking both a phone number and a name of the customer as a verification condition, so as to obtain identity information of the customer. The number of inputs of the customer experiences comments from a same customer is limited to a preset threshold (i.e., not larger than the preset threshold). Furthermore, a time interval between each two inputs of the customer experiences comments from the same customer is not shorter than a preset period. For example, if the preset threshold is 3 and the present period is one month, the number of the inputs of the customer experiences comments from the same customer is limited to be not greater than 3 and the time interval between each two inputs of the customer experiences comments from the same customer is not less than one month.

Further, the identity information of the customer is only stored in the database 01 so that other certification organization or other service firm has no right to view the identity information.

In an embodiment of the present disclosure, the rewarding module is configured to send rewards and gratitude expression to the mobile terminal 08 of the customer after the customer experiences comments of the customer is input to the inputting module and a score is acquired via the scale module. In more detail, for example, the rewards may be a mobile phone prepaid card of a preset value or a voucher of a preset value.

The indicator system based on SERVOUAL is exemnlarily shown as Table 1.

TABLE 1

| element | | dimension |
|---|---|---|
| appearance | T1 | attractive facilities |
| | T2 | completive facilities |
| | T3 | clean and tidy of employee's appearance |
| | T4 | consistency between facilities and services |

TABLE 1-continued

| element | | dimension |
|---|---|---|
| reliability | T5 | capacity of fulfilling commitments to customers |
| | T6 | showing sincerity to assist customers if needed |
| | T7 | trusty of the firm |
| | T8 | providing the services on time |
| | T9 | properly storing records related to services |
| response | T10 | informing customers the time of providing each service |
| | T11 | satisfaction between services and expectations of customers |
| | T12 | always happily providing assistances to customers |
| | T13 | providing services even if servicers are busy |
| assurance | T14 | trustable servicers |
| | T15 | providing services reassuring customers |
| | T16 | always being polite |
| | T17 | offering better services by helping each other |
| kindness | T18 | paying personal care to different customers |
| | T19 | paying attentions to customers |
| | T20 | knowing special requirements of customers |
| | T21 | putting a high premium on customers' interests |
| | T22 | providing servicing periods convenient for customers |

In an embodiment of the present disclosure, after the customer experiences comment of the customer is input to the inputting module and the score is acquired via the scale module, when the number of surveys is greater than a preset number, the analysis processor 02 is configured to catch common elements of the customer experiences by using a web crawler technology, and to update a scale according to an indicator system based on SERVQUAL with a first preset number of (for example 5) dimensions and a second preset number of (for example 22) indicators to extend the scale to a scale having preset dimensions. Taking an example for illustration, after the customer experiences comment of the customer is input to the inputting module and the score is acquired by the scale module, when the number of the surveys is greater than the preset number (such as 500), the analysis processor 02 at the side of Certification and Accreditation Administration is configured to automatically catch the common elements of the customer experiences and to automatically update the scale according to the indicator system based on SERVQUAL having 5 dimensions and 22 indicators to extend the checklist to have such as 6 or 7 dimensions.

In an embodiment of the present disclosure, after the customer experiences comment of the customer is input to the inputting module and the score is acquired via the scale module, when the number of the surveys is greater than a preset threshold, the analysis processor 02 is further configured, by means of a preset analysis software, to perform a dimension analysis, a confidence analysis, a validity analysis and a fitting and an evaluation of a structured model on the customer experiences comment to obtain an analyzed and evaluated result, and to store the analyzed and evaluated result in the database. For example, after the customer experiences comment of the customer is input to the inputting module and the score is acquired via the scale module according to the indicator system based on the SERVQUAL, when the number of the surveys is greater than the preset number (such as 500), the analysis processor 02 at the side of Certification and Accreditation Administration is configured, by means of the preset analysis software (such as SPSS15.0, AMO7.0, LISREL8.51 or their updated versions), to automatically perform the dimension analysis, the confidence analysis, the validity analysis and the fitting and an evaluation of a structured model on the customer experiences comment to obtain the analyzed and evaluated result, and to store the analyzed and evaluated result in the database 01.

In an embodiment of the present disclosure, the dimension analysis may be performed by a formula of:

$$S=(\Sigma_{i=1}^{n} A_i \times \alpha_i) \times E$$

where, S is an analysis result of the dimension analysis, n is a number of service dimensions, $A_i$ is a given score of comment of $i^{th}$ service dimension, $\alpha_i$ is an experience coefficient of the comment of the $i^{th}$ service dimension, and E is a vetoing coefficient of a service experience, E={0,1}.

In detail, the service dimension is judged one by one using a combination of judging between "yes" or "no" and a Likert scale. For example, an experience coefficient $\alpha_i$ of a 5-point Likert scale is determined as follows.

1. If customer experience is far lower than an expectation value, $0 \leq \alpha \leq 0.2$.
2. If customer experience is lower than the expectation value, $0.2 < \alpha \leq 0.4$.
3. If customer experience satisfy the expectation value, $0.4 < \alpha \leq 0.6$;
4. If customer experience is higher than the expectation value, $0.4 < \alpha \leq 0.6$;
5. If customer experience is far higher than the expectation value, $0.4 < \alpha \leq 0.6$;.

When a vetoing matter occurs on a certain service, E=0, otherwise, E=1. The vetoing matter varies from service to service, generally being a situation that seriously endangers the safety of the customer or has a serious safety hazard.

In an embodiment of the present disclosure, the confidence analysis is performed by performing verification using a Cronbach alpha coefficient (i.e., Cronbach alpha confidence coefficient). Cronbach alpha coefficient is a commonly used confidence coefficient, used for evaluating internal consistency for a wide range of applications in statistics. A range of the Cronbach alpha coefficient is from 0 to 1, reflecting a degree of similarity between groups of data. 0 means completely dissimilar, the closer to 1, the higher the confidence is, and 1 means completely consistent.

A formula for calculating the Cronbach alpha coefficient is as follows.

$$\gamma_\alpha = \left(\frac{k}{k-1}\right)\left(1 - \frac{\sum \sigma_i}{\sigma_2}\right)$$

where, k is a number of items to be evaluated, $\sigma_i$ is a variance of $i^{th}$ item to be evaluated, $\sigma$ is a variance of total test result.

In an embodiment of the present disclosure, the validity analysis is performed by using a confirmatory factor analysis in a structural equation model, including follows.

A factor model is defined, in which a number of factors is selected and factor load is defined. The factor load may be preset as 0, or other constant being able to freely change, or a number that can change under a certain constraint condition. Observed variables are collected. A covariance matrix of the variables is obtained according to initial data. A method (ordinarily used method includes maximum likelihood estimation, gradual distribution free estimation, and the like) is selected to estimate factor load being able to freely change. When the factor model is able to fitting data, selection of factor load may minimize a difference between a correlation matrix implied by the model and a real observed matrix, in which ordinarily used statistics parameters may be chi-square fit index (V2), comparative fit index (CFI), goodness-of-fit index (GFI), and root mean square error approximation. It is determined whether the model needs to be corrected according to initial fit result. If the fit effect of the model is not well, a constrained relationship is re-limited (such as adding causal relationship or associated relationship) according to a correction factor, and the model is corrected, such that a model with an optimized index.

In an embodiment of the present disclosure, when the service certification credential 07 is supervised or when the service certification credential is certified again by the certification system 03, the name of the service firm and a unique firm code are input. The database 01 is configured to send the customer comment based on the customer experience and the analyzed and evaluated result of the customer comment to the certification system 03 as a basis for judging quality of the services from the service firm when the certification system supervises the service certification credential or when the certification system certifies the service certification credential.

In conclusion, with the system according to embodiments of the present disclosure, with active participations of the customers, on the basis of the customer experiences, and by analyzing and evaluating the service quality of the service firm according to an automatically updatable indicator system based on SERVOUAL, a confidence of the customer to the service certification is enhanced and the service quality of the service firm is increased. Furthermore, a technical basis is provided to perfect a service certification system.

In order to understand the present disclosure better, operational principles and flowcharts of the system according to embodiments of the present disclosure will be exemplary described in detail with reference to specific examples.

Embodiment 1

In this embodiment, a service certification credential 07 for a restaurant issued by a certain certification organization is obtained after a first time certification is performed on is performed on the services from the restaurant by the certification organization. In order to show service qualities and dishes qualities of the restaurant, to expand popularity and to increase the number of customers, the service certification credential 07 is hung at a conspicuous position of an entrance of the restaurant. Customers who have consumed in the restaurant may scan the first QR code 071 of the service certification credential 07. For example, the first QR code 071 is configured to inquire a validity of the service certification credential 07.

When the first QR code 071 of the service certification credential 07 is scanned via a phone 08 by the customer, one or more pieces of information may be sent to the phone 08 by the certification system 03. The one or more pieces of information may include the organization name of the certification organization, the basic information of the service certification credential, the accreditation information indicating that the certification organization is accredited by the accreditation system 04 at the side of the Accreditation Service for Conformity Assessment, the registration information of a certification officer registered in the registration system 05 at the side of Certification and Accreditation Association, and the authorization information, authorized by the Certification and Accreditation Administration, for carrying out service certification businesses of the certification organization. When all pieces of the information are integrate and valid, it is indicated that the service certification credential 07 is valid.

After the customer has experienced the services of the restaurant, such as dining environment, a serving attitude of a server, a serving speed, prices of dishes, a taste of dishes and the like, the second QR code 072 of the service certification credential 07 may be scanned. For example, the second QR code 072 is configured to collect customer experiences.

After the second QR code 072 of the service certification credential 07 is scanned via the phone 08 by the customer, the phone 08 may be linked to the customer experience collecting interface via the database 01. The customer experience collecting interface includes two parts. One of the two parts is the basic information 0721 of the service firm. The basic information 0721 of the service firm includes, sent by the internal system 06, the facilities supported by the service firm, the management regulations of the service firm, the service blueprint 063 of the service firm, and the like. In the service blueprint 063, the nodes associated with the customer may be clickable for a customer to evaluate.

After the customer has browsed the basic information of the service firm, the customer experience collecting module 0722 may be entered. In order to ensure validity of surveys, and to avoid that the same customer files the surveys again and again, the identity of the customer may be firstly verified by informing the customer to input his name and his phone number. After both the name and the phone number are input, a survey stage is entered, in which the customer may input his customer comment based on the customer experience and may thus file the survey. A scale set according to a basic indicator system based on SERVQUAL having 5 dimensions and 22 indicators is used for initial survey in the surveys.

After the scale set according to the indicator system based on SERVQUAL is filed by the customer, the customer may freely publish a customer comment to the restaurant based on the customer experience via the inputting module. After the customer comment of the customer is complete, the customer experience collecting module may be exited, the rewarding module is configured to reward the customer with mobile phone prepaid cards of a preset value or vouchers of a preset value.

With an increase of number of customer comments input by the customers, when the number of surveys (i.e. the number of inputs of the customer comments based on the customer experiences) is greater than such as 500, the analysis processor 02 is configured, by means of a preset analysis software such as SPSS 15.0, AMOS 7.0, LISREL 8.51, updated versions thereof and the like, to perform a dimension analysis, a confidence analysis, a validity analysis and perform a fitting and evaluation of a structured model on the customer experiences comment to obtain an analyzed and evaluated result. The analyzed and evaluated result is stored into the database 01. On the other hand, the analysis processor 02 is further configured to catch common elements of the customer comments by using a web crawler technology, to update the scale according to the indicator system based on the SERVQUAL having 5 dimensions and 22 indicators to extend the checklist to have preset dimensions, such as 6 or 7 dimensions.

When the service certification credential of the service firm is supervised or when the service certification credential is certified again by the certification system, the name of the service firm and a unique firm code are input. The customer experiences and the analyzed and evaluated result are sent to the certification system 03 via the database 01 as a basis for judging quality of the services from the service firm when the certification system supervises the service certification credential or when the certification system certifies the service certification credential.

Embodiment 2

In this embodiment, a tourist attraction has passed a first time service certification of a certain certification organization, and obtains a service certification credential 07 issued by the certain certification organization. In order to enlarge popularity of the tourist attraction and to attract more tourists, the service certification credential 07 is hung at a conspicuous position of an entrance of the tourist attraction. The tourists may scan a first QR code 071 of the service certification credential 07. For example, the first QR code 071 is configured to inquire a validity of the service certification credential.

After the first QR code 071 of the service certification credential 07 is scanned via a phone 08 of the customer, one or more pieces of information may be sent to the phone 08 by the certification system 03. The one or more pieces of information may include the organization name of the certification organization, the basic information of the service certification credential, the accreditation information indicating that the certification organization is accredited by the accreditation system 04, the registration information of a certification officer registered in the registration system 05, the authorization information, authorized by the Certification and Accreditation Administration, for carrying out service certification businesses of the certification organization and the like. When all pieces of information are integrate and valid, it is indicated that the service certification credential 07 is valid.

After the customer has traveled in the tourist attraction and has experienced the services of the tourist attraction, such as environment of the tourist attraction, serving attitudes of servicers, conveniences of direction signs, a price of the tourist attraction, facilities supported by the tourist attraction, the second QR code 072 of the service certification credential 07 may be scanned. The second QR code 072 is configured to collect the customer experiences.

After the second QR code 072 of the service certification credential 07 is scanned via the phone 08 by the customer, the phone 08 may be linked to the customer experience collecting interface via the database 01. The customer experience collecting interface includes two parts. One of the two parts is the basic information 0721 of the service firm. The basic information 0721 of the service firm includes: provided by the internal system 06, the facilities supported by the service firm, the management regulations of the service firm, the service blueprint 063 of the service firm and the like. In the service blueprint 063, the nodes associated with the customer may be clickable for a customer to evaluate.

After the customer has browsed the basic information of the service firm, the customer experience collecting module 0722 may be entered. In order to ensure validity surveys, and to avoided that the same customer files the surveys again and again, the identity of the customer may be firstly verified by informing the customer to input his name and his phone number. After both the name and the phone number are input, a survey stage is entered, in which the customer may input the consumer comment based on the customer experience and may thus file the survey. A scale set according to a basic indicator system based on SERVQUAL having 5 dimensions and 22 indicators is used to perform an initial survey.

After the scale set according to the indicator system based on SERVQUAL is field by the customer, the customer may freely publish the customer comment to the restaurant based on the customer experience via the inputting module. After the customer comment of the customer is complete, the customer experience collecting module may be exited, the rewarding module is configured to automatically reward the customer with mobile phone prepaid cards of a preset value or vouchers of a preset value.

With an increase of number of customer comments input by the customers, when the number of the inputs of the customer comments based on the customer experiences (i.e. the number of surveys) is greater than such as 500, the analysis processor 02 is configured, by means of a preset analysis software such as SPSS 15.0, AMOS 7.0, LISREL 8.51, updated versions thereof and the like, to perform a dimension analysis, a confidence analysis, a validity analysis and perform a fitting and an evaluation of a structured model on the customer experience comment to obtain an analyzed and evaluated result. The analyzed and evaluated result is stored into the database 01. On the other hand, the analysis processor 02 is further configured to automatically catch common elements of the customer comments by using a web crawler technology, to automatically update the scale according to the indicator system based on the SERVQUAL having 5 dimensions and 22 indicators to extend the checklist to have preset dimensions, such as 6 or 7 dimensions.

When the service certification credential of the service firm is supervised or when the service certification credential is certified again by the certification system, the name of the service firm and a unique firm code are input. The customer comment and the analyzed and evaluated result are sent to the certification system 03 via the database 01 as a basis for judging quality of the services from the service firm when the certification system supervises the service certification credential or when the certification system certifies the service certification credential.

In conclusion, with the system according to embodiments of the present disclosure, on the basis of the customer experiences, with the service quality evaluation provided for the service firm and published after first hand experience by the customer, the customer comment is analyzed by using various analysis technologies. Furthermore, the customer comments are analyzed and the common elements are caught. Therefore, the service certification technology is optimized to provide a judgment basis for the certification organization to examine the services from the service firm.

With the system according to embodiments of the present disclosure, with active participations of customers, on the basis of the customer experiences, and by analyzing and evaluating the service quality of the service firm via an automatically updatable indicator system based on SERVQUAL, the confidence of the customers to the service certification is enhanced and the service quality of the service firm is increased. Furthermore, a technical basis is provided to perfect a service certification system.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments are exemplary and cannot be construed to limit the present disclosure, and changes, alternatives, and modifications can be made in the embodiments by those skilled in the art without departing from scope of the present disclosure.

What is claimed is:

1. A system for examining service certifications with multi-sides based on customer experiences, comprising: a database at a side of Certification and Accreditation Administration; an analysis processor at the side of the Certification and Accreditation Administration; a certification system at a side of a certification organization; an accreditation system at a side of Accreditation Service for Conformity Assessment, configured to accredit the certification organization; a registration system at a side of Certification and Accreditation Association for a certification officer to register; an internal system at a side of a service firm; and a mobile terminal at a side of a consumer, wherein a first time certification is performed on services from the service firm by the certification system to obtain a service certification credential of the service firm, the service certification credential comprises basic information of the service certification credential, a first QR (Quick Response) code configured to inquire a validity of the service certification credential and a second QR code configured to collect customer experiences; the mobile terminal is configured to identify the first QR code, and to receive, sent by the certification system, an organization name of the certification organization, the basic information of the service certification credential, accreditation information indicating that the certification organization is accredited by the accreditation system, registration information of a certification officer registered in the registration system, and authorization information, authorized by the Certification and Accreditation Administration, for carrying out service certification businesses of the certification organization; after the second QR code is identified by the mobile terminal, the mobile terminal is linked to a customer experience collecting interface at the side of the Certification and Accreditation Administration via the database, wherein the customer experience collecting interface comprises: basic information of the service firm and a customer experience collecting module, wherein the basic information of the service firm comprises, provided by the internal system, facilities supported by the service firm, management regulations of the service firm and a service blueprint of the service firm, and the costumer experience collecting module comprises a costumer identity verification module, a scale module set according to an indicator system based on SERVQUAL, an inputting module configured to input customer comments, and a rewarding module configured to reward the customers, wherein the costumer identity verification module is configured to verify a customer by taking both a phone number and a name of the customer as a verification condition, so as to obtain identity information of the customer, wherein a number of inputs of the customer experiences comments from a same customer is not larger than a preset threshold, and a time interval between each two inputs of the customer experiences comments from the same customer is not shorter than a preset period.

2. The system according to claim 1, wherein, in the service blueprint, nodes associated with the customers are clickable for a customer to evaluate.

3. The system according to claim 1, wherein the identity information of the customer is stored in the database, and other certification organization or other service firm has no right to view the identity information.

4. The system according to claim 1, wherein the rewarding module is configured to reward a customer and to send gratitude expression to the mobile terminal of the customer after the customer experiences comment of the customer is input to the inputting module and a score is acquired via the scale module.

5. The system according to claim 4, wherein the rewarding module is configured to reward the customer with a mobile phone prepaid card of a preset value or a voucher of a preset value.

6. The system according to claim 4, wherein after the customer experiences comment of the customer is input to the inputting module and the score is acquired via the scale module, when a number of surveys is greater than a preset number, the analysis processor is configured to catch common elements of the customer experiences by using a web crawler technology, and to update a scale according to an indicator system based on SERVQUAL having a first preset number of dimensions and a second preset number of indicators to extend the scale to a scale having preset dimensions.

7. The system according to claim 6, wherein the first preset number is 5, and the second preset number is 22.

8. The system according to claim 4, wherein after the customer experiences comment of the customer is input to the inputting module and the score is acquired via the scale module, when a number of surveys is greater than a preset threshold, the analysis processor is configured, by means of a preset analysis software, to perform a dimension analysis, a confidence analysis, a validity analysis and a fitting and evaluation of a structured model on the customer experiences comment to obtain an analyzed and evaluated result, and to store the analyzed and evaluated result in the database.

9. The system according to claim 8, wherein the dimension analysis is performed by a formula of:

$$S=(\Sigma_{i=1}^{n} A_i \times \alpha_i) \times E$$

where, S is an analysis result of the dimension analysis, n is a number of service dimensions, $A_i$ is a given score of comment of $i^{th}$ service dimension, $\alpha_i$ is an experience coefficient of the comment of the $i^{th}$ service dimension, and E is a vetoing coefficient of a service experience, $E=\{0,1\}$.

10. The system according to claim 8, wherein the confidence analysis is performed by using a Cronbach alpha coefficient.

11. The system according to claim 8, wherein the validity analysis is performed by using a confirmatory factor analysis in a structural equation model.

12. The system according to claim 4, when the service certification credential is supervised or when the service certification credential is certified again by the certification system, the name of the service firm and a unique firm code are input, the database is configured to send the customer comment and an analyzed and evaluated result of the customer comment to the certification system as a basis for judging quality of the services from the service firm when the certification system supervises the service certification credential or when the certification system certifies the service certification credential.

13. The system according to claim 1, wherein the mobile terminal is a smart phone or a handheld typed code scanner.

* * * * *